United States Patent
Wu

(10) Patent No.: US 6,382,590 B1
(45) Date of Patent: May 7, 2002

(54) DISTRIBUTION VALVE

(75) Inventor: Yin-Ke Wu, Chang Hua Hsien (TW)

(73) Assignee: Cheng-Yui Company, Ltd., Chang Hua Hsien (TW)

( * ) Notice: Subject to any disclaimer, the term of this patent is extended or adjusted under 35 U.S.C. 154(b) by 0 days.

(21) Appl. No.: 09/722,245

(22) Filed: Nov. 27, 2000

(51) Int. Cl.$^7$ .............................................. F16K 29/00
(52) U.S. Cl. ....................................... 251/286; 251/288
(58) Field of Search ................................ 251/288, 286, 251/304, 315.01, 315.1

(56) References Cited

U.S. PATENT DOCUMENTS 2,912,217 A * 11/1959 Freeman et al. ............ 251/214
2,923,318 A * 2/1960 Monson ................... 251/288 X
4,846,221 A * 7/1989 Kanemaru ............... 251/288 X

* cited by examiner

Primary Examiner—Kevin Lee
(74) Attorney, Agent, or Firm—Harrison & Egbert

(57) ABSTRACT

A distribution valve is formed of a tubular body, a rotating body, a spherical body, and a handle. The tubular body is provided with a fitting tube in communication with the hollow interior of the tubular body. The spherical body is rotatably disposed in the interior of the tubular body such that the spherical body is located by the handle via the rotating body which is fastened at one end with the handle, and is engaged at the other end to the spherical body. The rotation of the spherical body is confined by a pin which is turned along with the rotating body within the confines of a pin hole of a predetermined length.

2 Claims, 10 Drawing Sheets

DISTRIBUTION VALVE

BACKGROUND OF THE INVENTION

1. Field of the Invention

The present invention relates generally to a distribution valve, and more particularly to a locating structure of the distribution valve.

2. Description of Related Art

As shown in FIG. 1, a distribution valve 10 of the prior art has a tubular body 11 which is provided with a fitting tube 12 in communication with the hollow interior of the tubular body 11. The fitting tube 12 is provided at the top end with a cut 13. A ball valve 14 has a bolt body 15. The ball valve 14 is disposed in the hollow interior of the tubular body 11 such that the bolt body 15 is received in the fitting tube 12. A rotary knob 16 is provided at one end with a pillar 17, which is received in the fitting tube 12 such that the pillar 17 is fastened to the bolt body 15 of the ball valve 14 by a fastening screw 18, and such that a protruded block 19 of the rotary knob 16 is rested on the cut 13 of the fitting tube 12. The ball valve 14 is actuated to turn in the tubular body 11 by the rotary knob 16. The rotation of the rotary knob 16 is confined by the protruded block 19 and the cut 13.

The distribution valve 10 of the prior art is defective in design because the installation of the ball valve 14 in the interior of the tubular body 11 is different and rather time-consuming in view of the combined diameter of the ball valve 14 and the bolt body 15 being greater than the inner diameter of the tubular body 11. In addition, the bolt body 15 of the ball valve 14 is fastened to the rotary knob 16 by the fastening screw 18, which is apt to loosen so as to result in separation of the protruded block 19 from the cut 13 of the fitting tube 12. As a result, the ball valve 14 cannot be positioned by the rotary knob 16.

BRIEF SUMMARY OF THE INVENTION

The primary objective of the present invention is to provide a distribution valve with a locating structure free from the deficiencies of the prior art distribution valve described above.

In keeping with the principle of the present invention, the foregoing objective of the present invention is attained by a distribution valve comprising a tubular body, a fitting tube, a rotating body, a handle, and a spherical body. The spherical body is rotatably disposed in the interior of the tubular body such that the spherical body is located by the handle via the rotating body which is fastened at one end to the handle, and is engaged at other end to the spherical body.

DETAILED DESCRIPTION OF THE INVENTION

Figure 1:
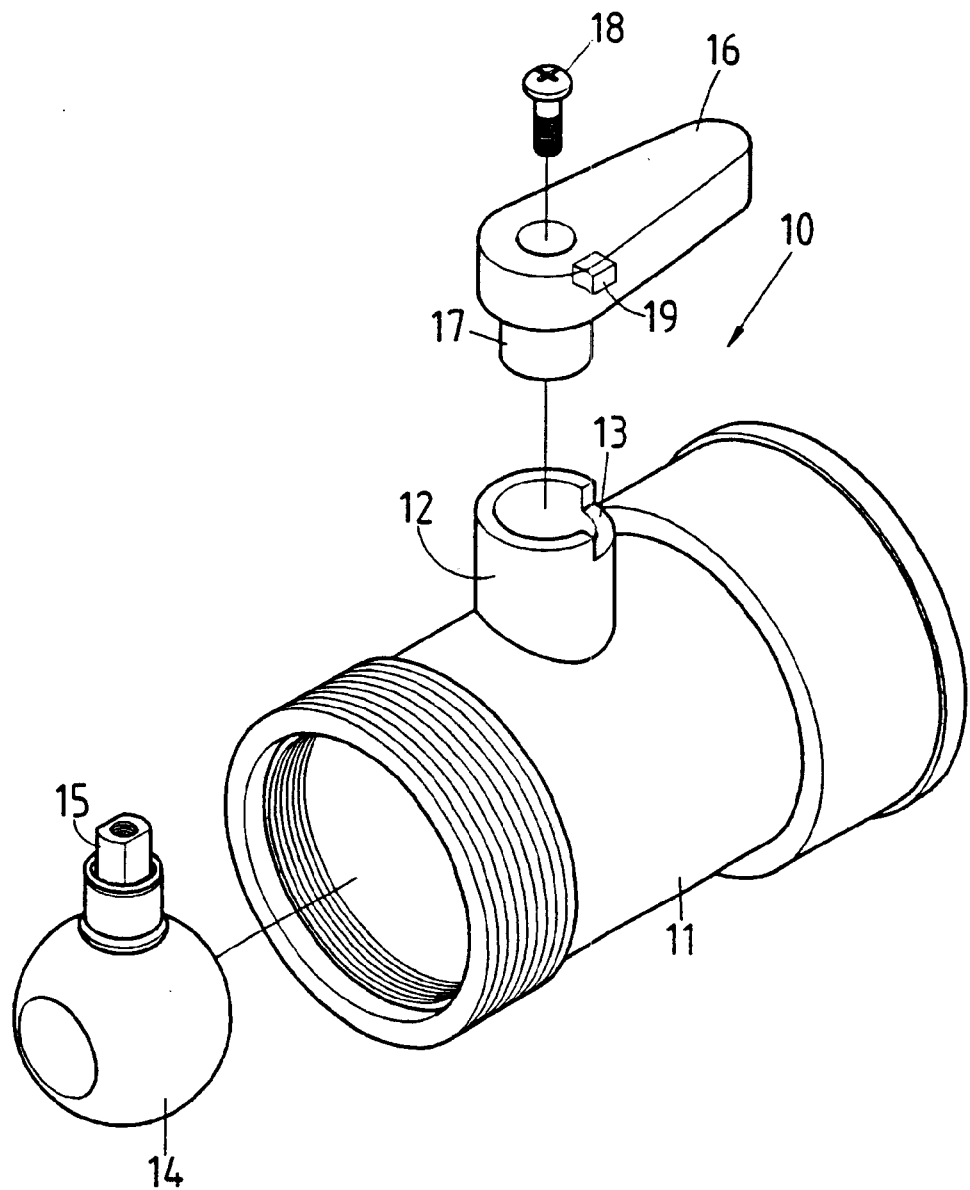
FIG. 1 shows an exploded perspective view of a distribution valve of the prior art.
Figure 2:
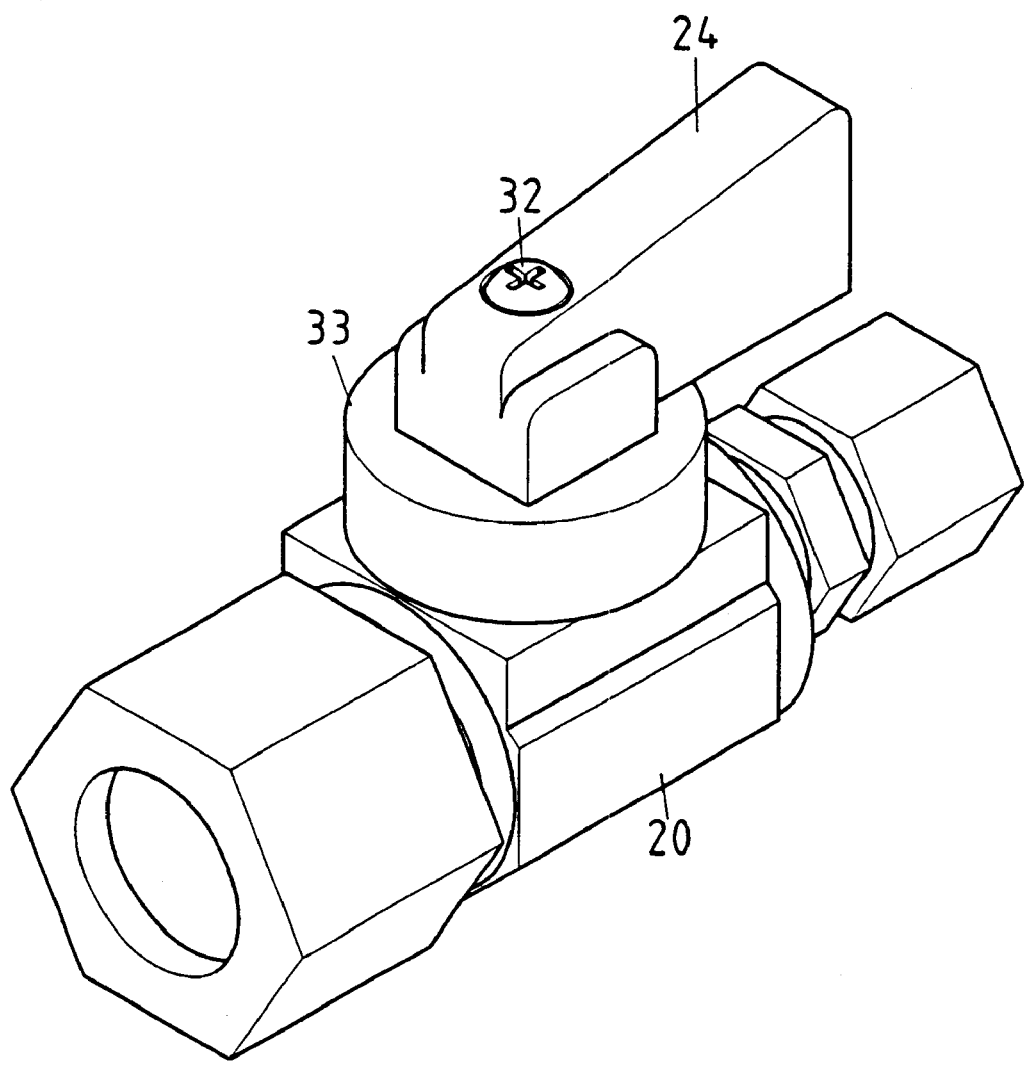
FIG. 2 shows a perspective view of a distribution valve of the present invention.
Figure 3:
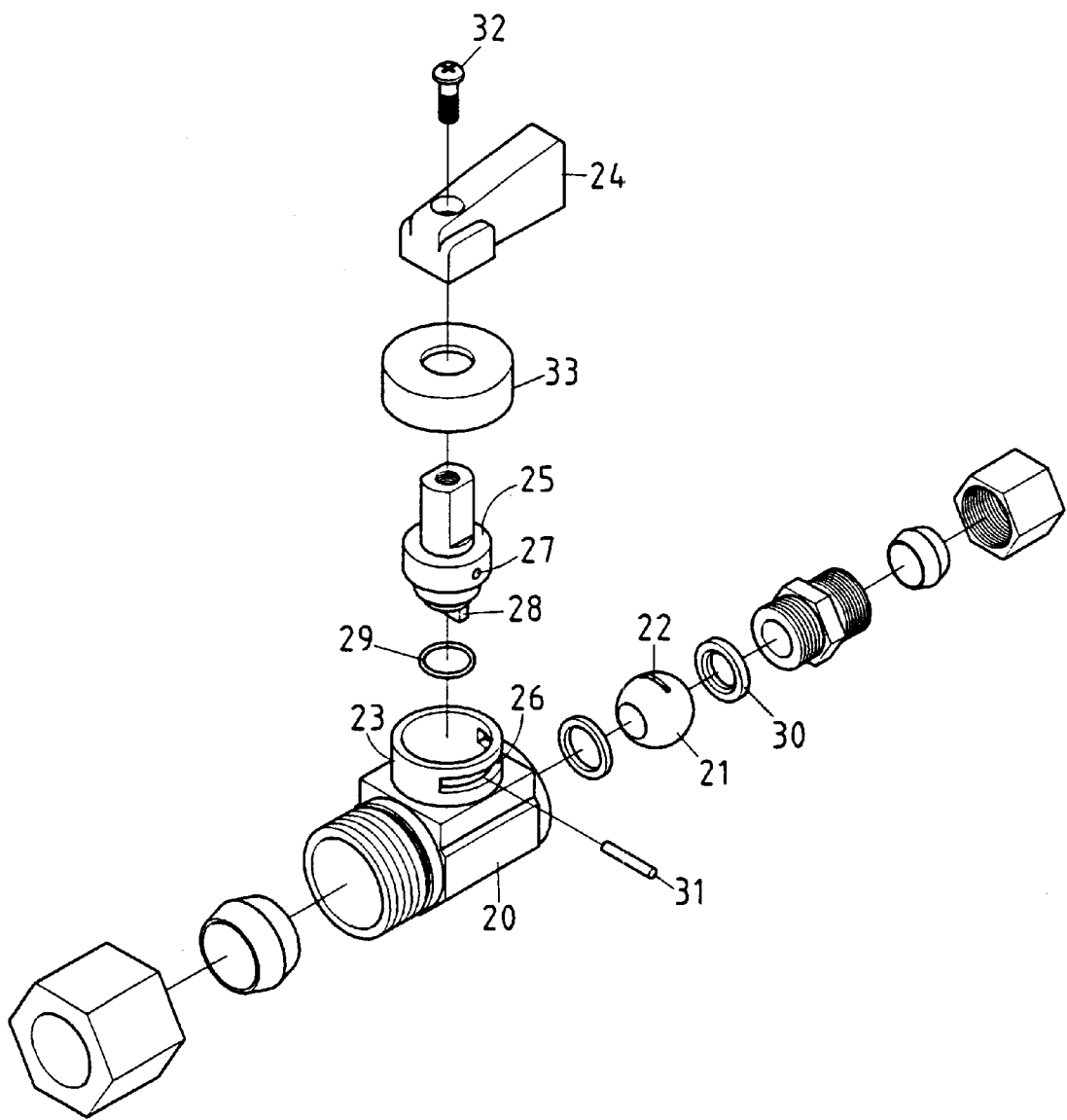
FIG. 3 shows an exploded perspective view of the distribution valve of the present invention.

As shown in FIGS. 2–6, a distribution valve of the present invention comprises a tubular body 20, a spherical body 21, a rotating body 25, and a handle 24.

The tubular body 20 has a hollow interior and is provided with a fitting tube 23 in communication with the hollow interior of the tubular body 20. The fitting tube 23 has an open top and is provided in the side wall thereof with a pin hole 26 of a predetermined length.

The spherical body 21 is provided with a retaining slot 22 and is received rotatably in the hollow interior of the tubular body 20.

The rotating body 25 is provided in the outer wall of the midsegment thereof with a retaining hole 27, and at the bottom end thereof with a retaining protrusion 28 which is dimensioned to fit into the retaining slot 22 of the spherical body 21. The rotating body 25 is provided at the top end thereof with a threaded hole engageable with a fastening bolt 32.

The handle 24 is provided at one end with a through hole which is so dimensioned as to allow the fastening blot 32 to be put therethrough.

In combination., the spherical body 21 is rotatably disposed in the interior of the tubular body 20 such that the retaining slot 22 of the spherical body 21 retains the retaining protrusion 28 of the rotating body 25 which is rotatably received in the fitting tube 23 of the tubular body 20. The rotation of the rotating body 25 is confined by a pin 31 which is retained at one end thereof in the retaining hole 27 of the rotating body 25, with the other end of the pin 31 being flush with the outer wall of the fitting tube 23. The pin 31 moves along with the rotating body 25 in the range corresponding to the length of the pin hole 26 extending along the wall of the fitting tube 23. The rotating body 25 is rotatably received in the fitting tube 23 in conjunction with a washer 29. The rotating body 25 is fastened to the handle 24 by the fastening bolt 3.2, which is engaged with the threaded hole of the top end of the rotating body 25 via the through hole of one end of the handle 24. As the handle 24 is turned, the rotating body 25 is actuated to turn, thereby driving the spherical body 21 to turn. It must be added here that the spherical body 21 is disposed in the interior of the tubular body 20 in conjunction with two washers 30.

The distribution valve of the present invention can be used in a horizontal position, as shown in FIGS. 2–6, or in an upright position, as shown in FIGS. 7–10.

Figure 4:
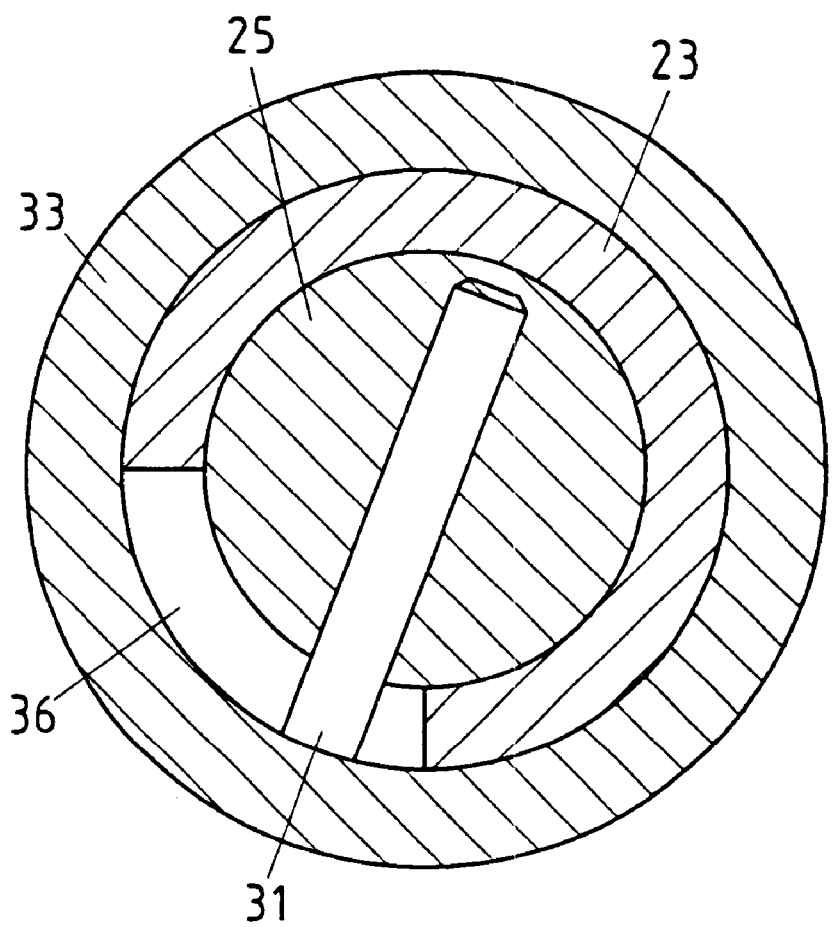
FIG. 4 shows a partial sectional view of the distribution valve of the present invention.
Figure 5:
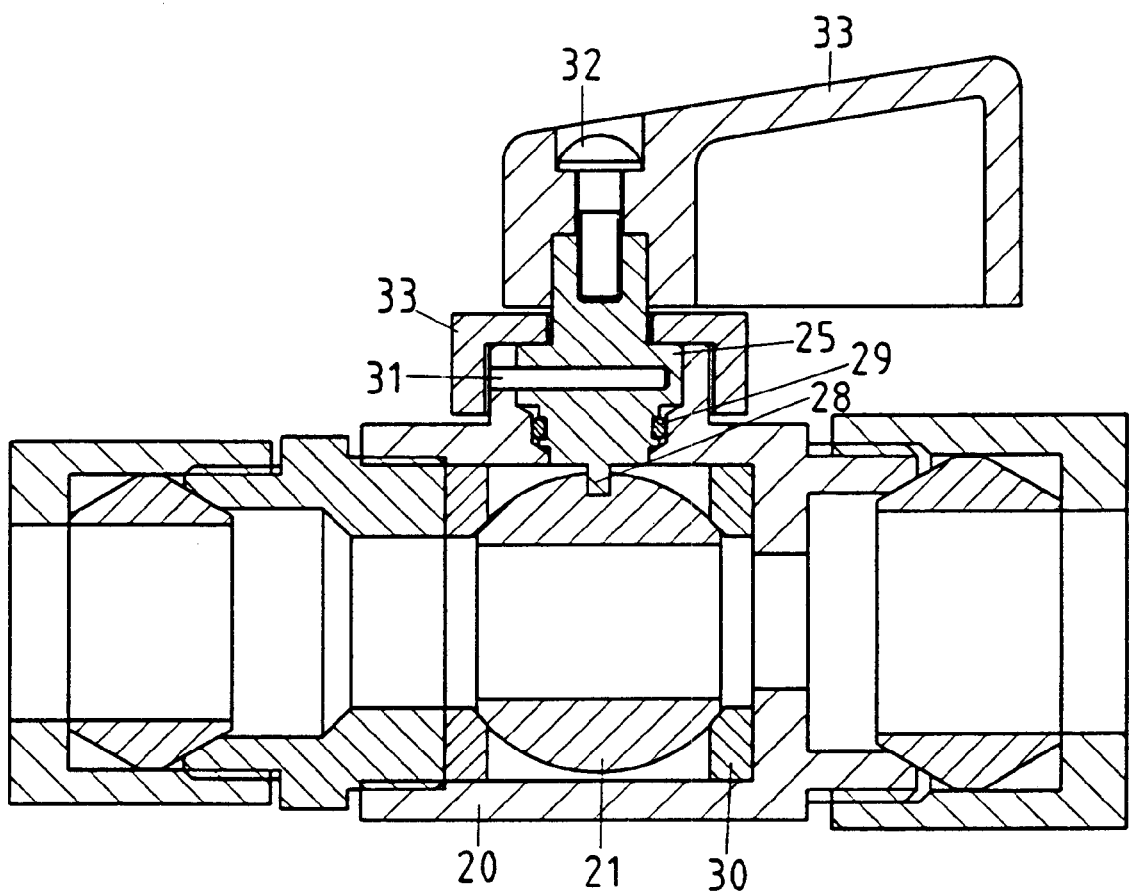
FIG. 5 shows a longitudinal sectional view of the distribution valve of the present invention.
Figure 6:
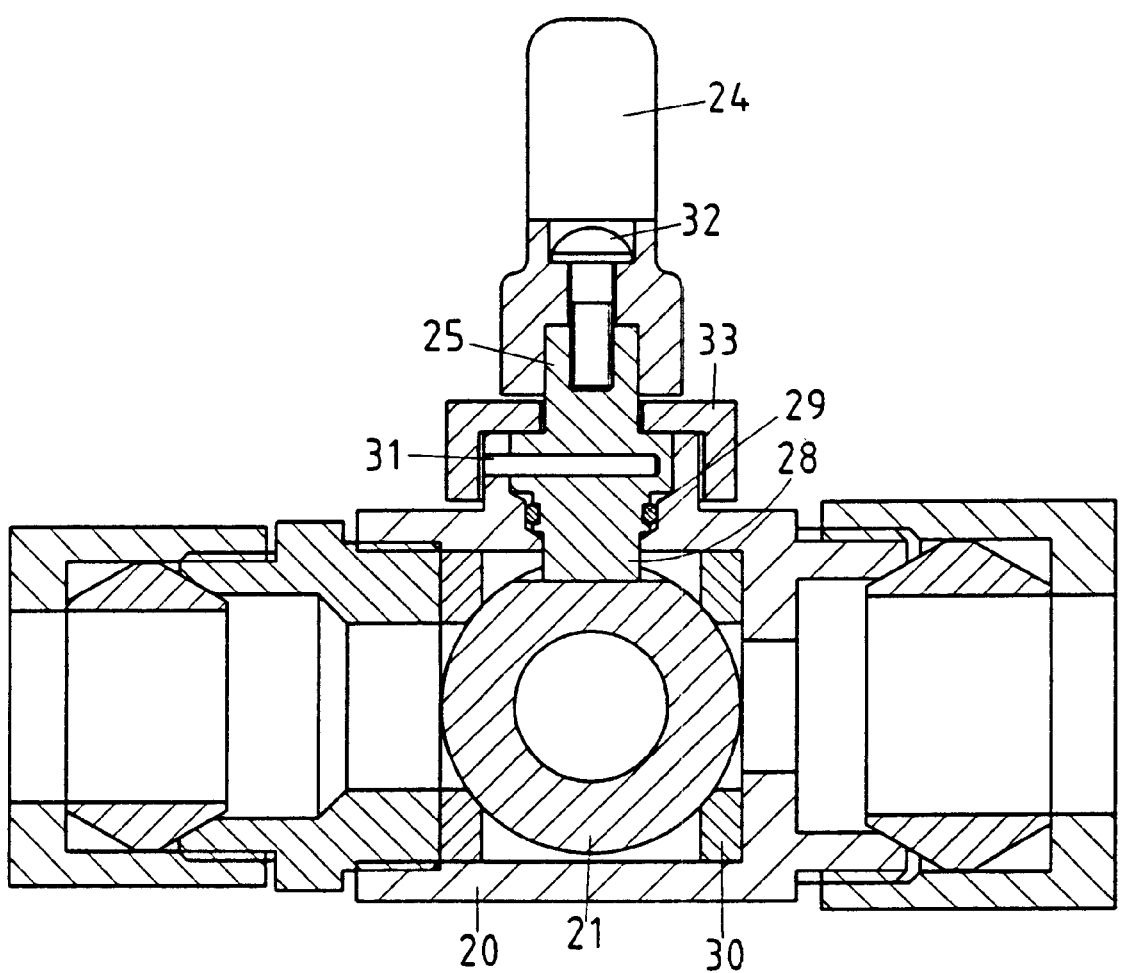
FIG. 6 shows another longitudinal sectional view of the distribution valve of the present invention.
Figure 7:
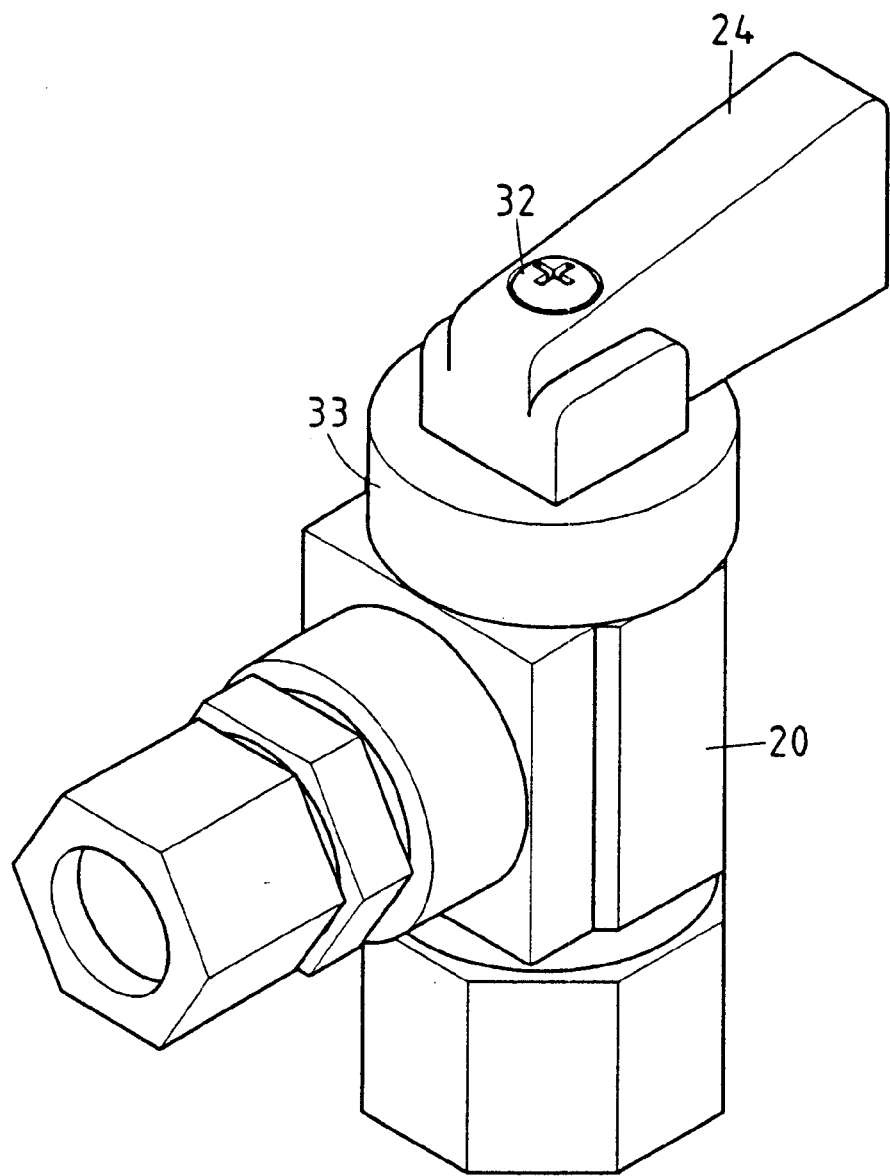
FIG. 7 shows another perspective view of the present invention.
Figure 8:
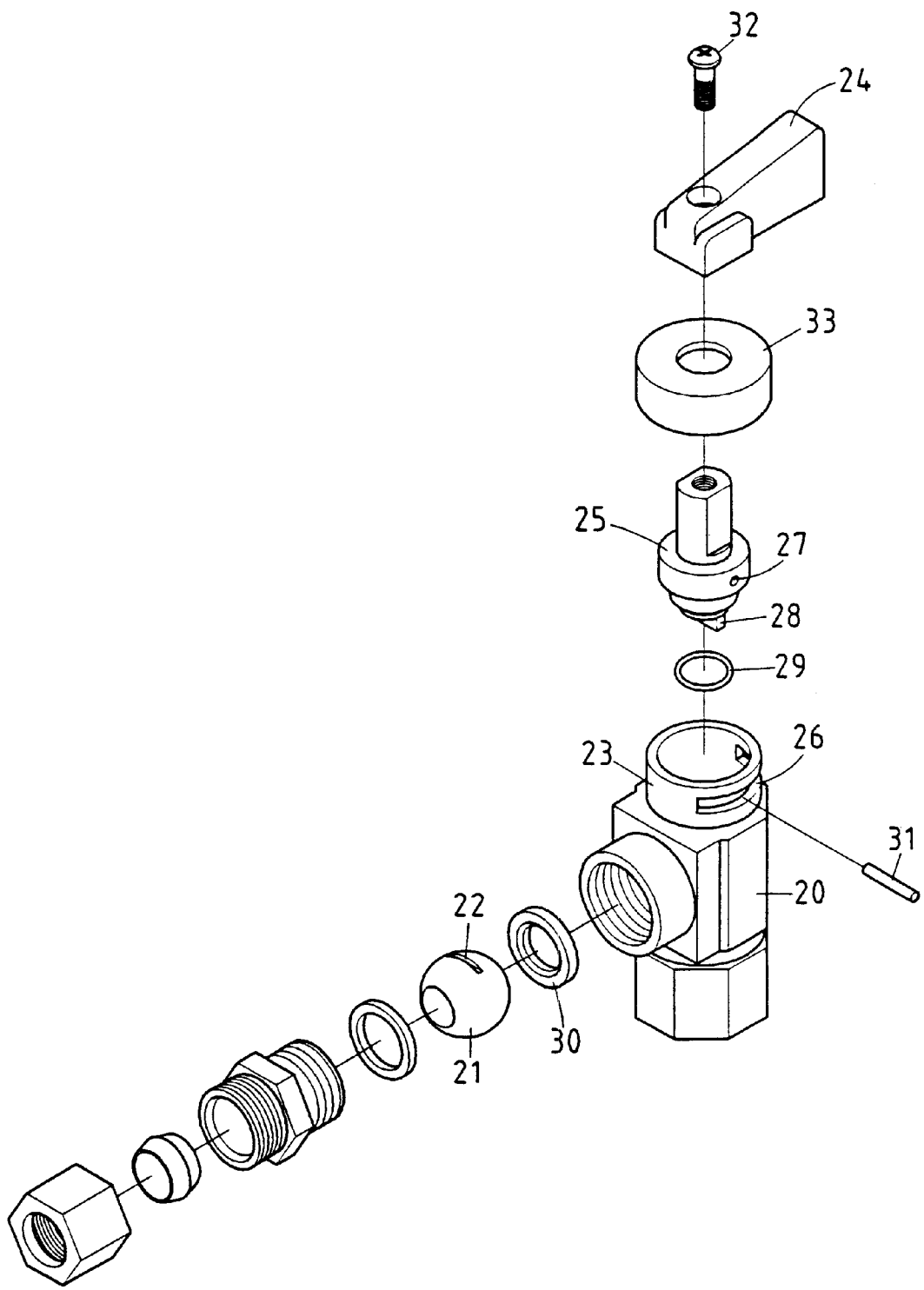
FIG. 8 shows an exploded view of the present invention as shown in FIG. 7.
Figure 9:
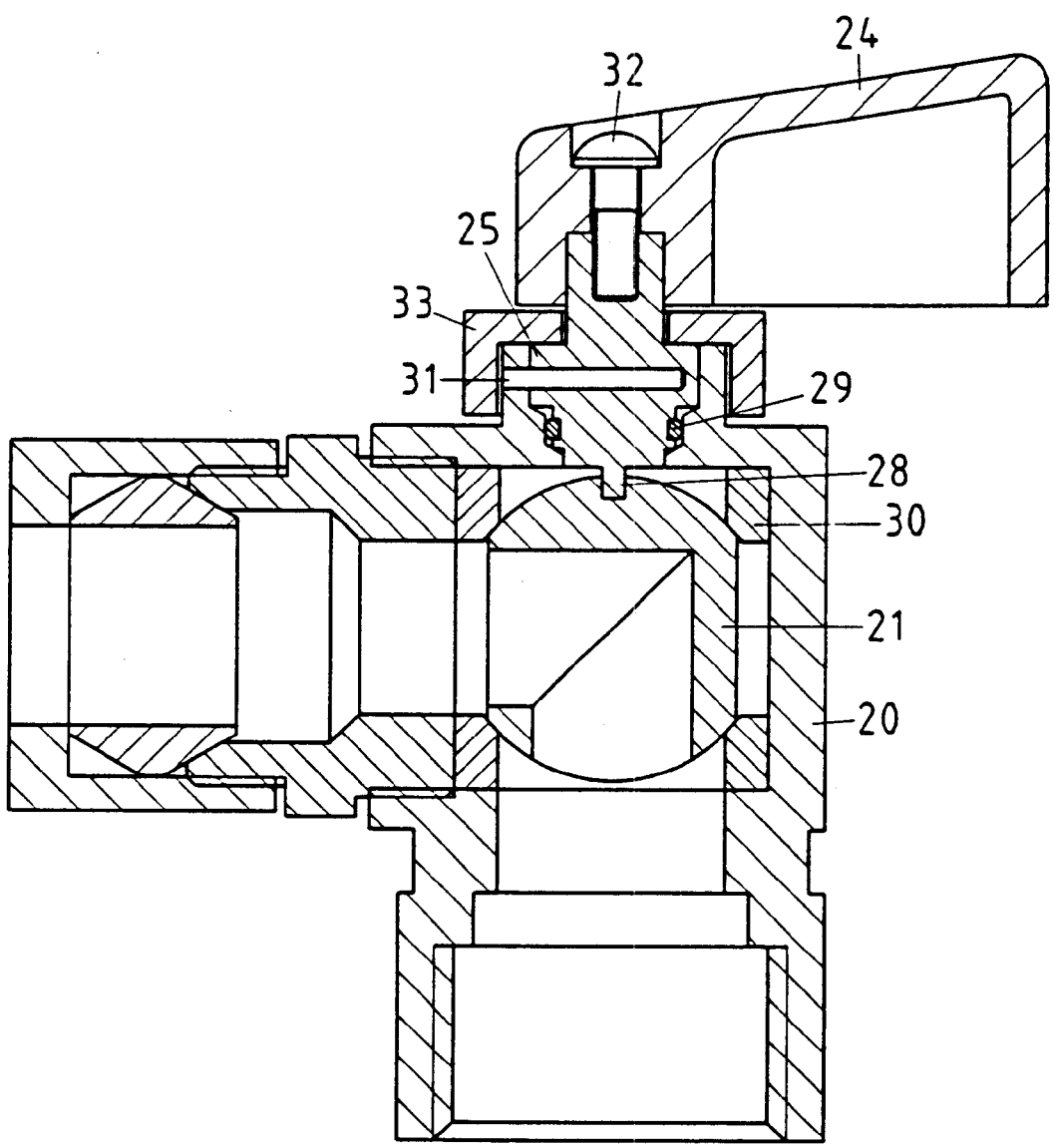
FIG. 9 shows a longitudinal sectional view of the present invention as shown in FIG. 7.
Figure 10:
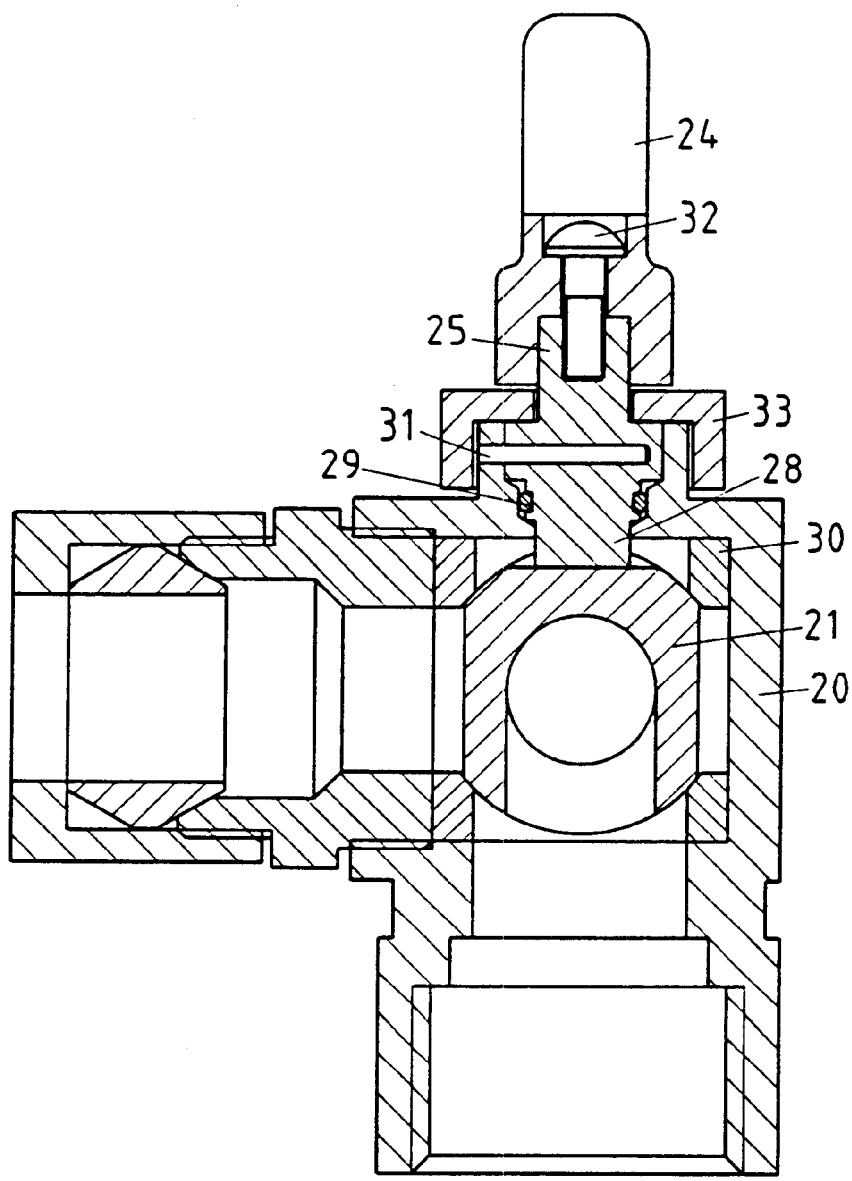
FIG. 10 shows another longitudinal sectional view of the present invention as shown in FIG. 7.

The fitting tube 23 of the tubular body 20 is provided with a jacket 33, which is fitted over the fitting tube 23 such that the pin 31 is prevented from slipping out of the pin hole 26, as illustrated in FIG. 4.

I claim:

1. A distribution valve comprising:
    a tubular body having a hollow interior, said tubular body having a fitting tube integrally formed therewith, said fitting tube having an interior in communication with said hollow interior of said tubular body, said fitting tube having a pin hole formed in a wall thereof, said pin hole having a length dimension;

a spherical body having a linear retaining slot, said spherical body being rotatably disposed in said hollow interior of said tubular body adjacent said interior of said fitting tube;

a rotatable body having a linear retaining protrusion integrally formed at one end thereof, said rotatable body having a retaining hole at a midsegment thereof, said rotatable body having a threaded hole at an opposite end thereof, said rotatable body being rotatably received in said interior of said fitting tube, said retaining protrusion slidably received within said retaining slot of said spherical body, said retaining protrusion having a length dimension less than a diameter of said interior of said fitting tube;

a pin received within said retaining hole of said rotatable body, said pin having an end flush with an outer wall of said fitting tube and extending through said pin hole of said fitting tube; and a handle having a through hole at one end thereof, said handle fastened by a fastening bolt to an opposite end of said rotatable body, said fastening bolt engaged with said threaded hole of said rotatable body through said through hole of said handle such that an external force applied to said handle causes said rotatable body to rotate through a range defined by said pin within said pin hole of said fitting tube and to correspondingly rotate said spherical body in said interior of said tubular body.

2. The distribution valve of claim 1, further comprising:

a jacket fitted over said fitting tube of said tubular body such that said pin and said pin hole are enclosed by said jacket.

* * * * *